United States Patent [19]

Dean et al.

[11] 4,404,507
[45] Sep. 13, 1983

[54] FORMING CONTOURS

[75] Inventors: Stanley K. Dean, Parkville; Robert Dow, Oak Park, both of Australia

[73] Assignee: Commonwealth of Australia, Canberra, Australia

[21] Appl. No.: 324,671

[22] Filed: Nov. 24, 1981

[30] Foreign Application Priority Data

Nov. 25, 1980 [AU] Australia ................... PE 6623

[51] Int. Cl.³ ............................................ G05B 19/24
[52] U.S. Cl. .................................. 318/570; 318/523; 364/168
[58] Field of Search ............. 318/570, 571, 573, 696; 364/168

[56] References Cited

U.S. PATENT DOCUMENTS

| 3,518,513 | 6/1970 | Pomella et al. | 318/571 |
| 3,525,917 | 8/1970 | Leenhouts | 318/570 |
| 3,564,595 | 2/1971 | De Florio et al. | |
| 4,059,746 | 11/1977 | Haga | 318/573 X |
| 4,066,944 | 1/1978 | Leenhouts | 318/603 X |
| 4,164,693 | 8/1979 | Leenhouts | 318/571 X |
| 4,362,979 | 12/1982 | Cannon | 318/603 |

FOREIGN PATENT DOCUMENTS

| 1348325 | 3/1974 | United Kingdom . |
| 1372291 | 10/1974 | United Kingdom . |
| 1419830 | 12/1975 | United Kingdom . |
| 1464015 | 2/1977 | United Kingdom . |

Primary Examiner—B. Dobeck
Attorney, Agent, or Firm—Schwartz, Jeffery, Schwaab, Mack, Blumenthal & Koch

[57] ABSTRACT

There is disclosed a method of controlling, and a control system for, an apparatus, such as a machine tool (100), for forming a straight configured contour, or a straight configured segment forming part of a curvilinear contour, and having co-ordinates in at least two directions (X, Y and Z), said apparatus incorporating a work piece support (102), a contour forming means, such as a milling cutter (107), incremental drives ($M_X$, $M_Y$ and $M_Z$) to effect relative movement between said support (102) and said milling cutter (107) in said directions, and involving determining the components of said contour or segment in said directions (X, Y and Z) as a number of increments of length equal to a predetermined distance, providing a continuous feed of input pulses in a computer (S B C), continuously counting in the S B C, in respect of each said direction, a predetermined number of input pulses in the ratio of the inverses of said number of increments, and subsequently feeding via motor control (MCB) and motor drive (MDB) boards, (i) a drive pulse to one of said incremental drives ($M_X$, $M_Y$ or $M_Z$) to effect movement in one of said direct directions (X, Y or Z) over said predetermined distance each time the predetermined number of input pulses relevant to that direction have been counted, and (ii) a drive pulse to at least one other of said incremental drives ($M_X$, $M_Y$ or $M_Z$) to effect movement in one other of said directions (X, Y or Z) over the same predetermined distance each time the predetermined number of input pulses relevant to that direction have been counted, whereby said movements combine to form a relative movement between said support (102) and said milling cutter (107) such as to produce said contour or said segment.

6 Claims, 16 Drawing Figures

7 PIN CANNON SOCKETS TO MOTORS 7.5A/PHASE

FIG. 9.

FIG. 10. MOTOR CONTROL BOARD (M.C.B)

CIRC

Fig. 16

SIMULATING THREE COUNTERS WITH THE INTERNAL REGISTERS OF THE MICROPROCESSER

FORMING CONTOURS

TECHNICAL FIELD

This invention relates to forming contours, and more particularly to forming contours either of straight line and/or curvilinear form, utilising a computer numerical control system (C N C system).

The invention is particularly applicable to the machining of contours, although the invention also has other applications, such as, the drawing or scribing of lines on metal plate or sheet material, including fabrics, prior to cutting operations, or in relation to the preparation of drawings including the preparation of contour maps.

BACKGROUND ART

The application of C N C systems to machine tools in particular has significantly advanced the machining of shapes, particularly shapes which are not of circular or straight line forms which are normally quickly and accurately accomplished using conventional machine tools.

The simplest method of applying a C N C system is to use incremental drives, such as stepping motors, which rotate the leadscrews of a machine tool by fixed increments corresponding to the outward pulses from a computer.

Industry now demands both high dimensional resolution (typically $10^{-4}$ in (2.54 $\mu$m)), and high machine speed (typically 200-300 in/min (5-7.62 m/min)), thus requiring drive steps of $10^{-4}$ in (2.54 $\mu$m) to obtain the desired dimensional resolution and an output to the stepping motors from the computer control system of up to $5 \times 10^4$ pulses per second. Commonly, contour interpolation programmes for two and three dimensional motion contain from about 100 to several hundred instructions. With such requirements a relatively inexpensive computer, with an average execution time of 2 $\mu$sec per instruction has a pulse output or drive pulse to the stepping motors of only 10% of the desired rate or less.

Therefore, with conventional drives and interpolating methods, the machine speed can only be increased to that demanded by industry by increasing the size of the drive steps executed by the stepping motors which results in a reduction of dimensional resolution thus failing to meet industry's other demand.

Attention has been given to developing more complex, and therefore expensive, control systems and/or incremental drives, to allow for greater travel per drive pulse whilst keeping the surface quality to the required standard. Such systems are disclosed in a paper shortly to be published by CIRP and entitled "Digital Controls and Feed Drives State-of-the-Art and New Developments" by J. G. Bollinger, G. Stute, H. Van Brussel and J. Dinsdale. Another example of the complexity of such known systems capable of coping with the demands of industry in relation to high dimensional resolution and high machine speed, is disclosed in U.S. Pat. No. 3,969,615 (Bowers et al).

It is an object of the present invention to provide a method of forming contours, and a control system adapted for association with the contour forming apparatus, which, in the particular application to machine tools, will achieve the demands of industry in relation to both high dimensional resolution and high machine speed, but which is inexpensive compared with known control systems capable of achieving such demands.

DISCLOSURE OF THE INVENTION

The basis of the present invention rests with reducing the number of computing instructions to be handled by the C N C system, by, in the case of a straight configured contour, or in the case of a straight line segment forming part of a curvilinear contour, determining the components thereof as a number of increments of length equal to a predetermined distance. In the case of a two-dimensional contour the components thereof are determined in the two directions and incremental drives are provided to produce relative movement in those two directions and being capable of advancing over the predetermined distance on receipt of a drive pulse, whilst with three-dimensional contours the components are determined in three directions and incremental drives are provided to achieve relative movement in those three directions whilst being capable of advancing over the predetermined distance in response to an input pulse. Feed input pulses are continuously fed to a counter for each individual drive. Each counter counts a predetermined number of input pulses such that the ratios of the numbers of input pulses is equal to the ratios of the inverses of the numbers of increments relevant to the component of the contour or segment in the directions of the related drives with which the component is associated, and the respective counter only initiates the feeding of a drive pulse to that motor when the predetermined number of input pulses have been counted, whereafter the counter recommences counting the continuous feed of input pulses.

It will be appreciated that as a result of the above system a small number of computing instructions need to be executed per drive pulse. With such a system a relatively high number of input pulses can be broken down into a relatively small number of drive pulses to be computed for each incremental drive, and the incremental drives are only required to advance over a constant predetermined distance per drive pulse. In addition, the speed of advance or travel can be easily kept constant, or even varied if necessary, to reduce acceleration caused by changes in direction of travel when the contour changes from one straight configured segment to another straight configured segment forming a small part of a contour of curvilinear configuration, or between a straight section and a curvilinear section of a contour having both straight and curvilinear sections forming parts thereof.

The invention may therefore envisage a method of controlling an apparatus for forming a straight configured contour, or a straight configured segment forming part of a curvilinear contour, and having co-ordinates in at least two directions, said apparatus incorporating a work piece support, a contour forming means, incremental drives to effect relative movement between said support and said contour forming means in said directions, said method comprising the steps of;

(a) determining the components of said contour or segment in said directions as a number of increments of length equal to a predetermined distance, (b) providing a continuous feed of input pulses, (c) continuously counting, in respect of each said direction, a predetermined number of input pulses in the ratio of the inverses of said number of increments, and (d) subsequently feeding, (i) a drive pulse to one of said incremental drives to effect movement in one of said directions over said predetermined distance each time the predetermined number of input pulses relevant to that direction have been counted, and (ii) a drive pulse to at least one other of said incremental drives to effect movement in one other of said directions over the same predetermined distance each time the predetermined number of input pulses relevant to that direction have been counted, whereby said movements combine to form a relative movement between said support and said contour forming means such as to produce said contour or said segment.

The invention may also envisage a control system adapted for association with an apparatus for forming a straight configured contour, or a straight configured segment forming part of a curvilinear contour, and having co-ordinates in at least two directions, said apparatus being of the type comprising a work piece support, a contour forming means, incremental drives to effect relative movement between said support and said contour forming means in said directions, said control system being adapted to deliver drive pulses to said incremental drives, and comprising means to continuously receive input pulses, means to continuously count, in respect of each said direction, a predetermined number of input pulses in accordance with the ratio of the inverses of a number of increments of predetermined distance making up the components of said contour or segment in said directions, means for, in use, feeding (i) a drive pulse to one of said incremental drives to effect movement in one of said directions over said predetermined distance each time the predetermined number of input pulses relevant to that direction have been counted, and (ii) a drive pulse to at least one other of said incremental drives to effect movement in one other of said directions over the same predetermined distance each time the predetermined number of input pulses relevant to that direction have been counted, whereby said movements combine to form a relative movement between said support and said contour forming means such as to produce said contour or said segment.

In the situation where the invention is applied to the drawing or scribing of lines the contour forming means takes the form of a drawing or scribing implement carried by the apparatus and may be controlled to draw or scribe a line of the contour required, whilst, in the case of an apparatus to machine contours, that is, a machine tool, the contour forming means is a material removing means, such as a milling cutter, grinding wheel or other machining or cutting device, including an oxy-acetylene cutting unit, and in respect of which either the tool head is controlled to move in the required directions, or the workpiece support is controlled to move in the required directions.

BRIEF DESCRIPTION OF THE DRAWINGS

One preferred embodiment of the invention will now be described with reference to the accompanying drawings, in which.

BEST MODE FOR CARRYING OUT THE INVENTION

Figure 1:
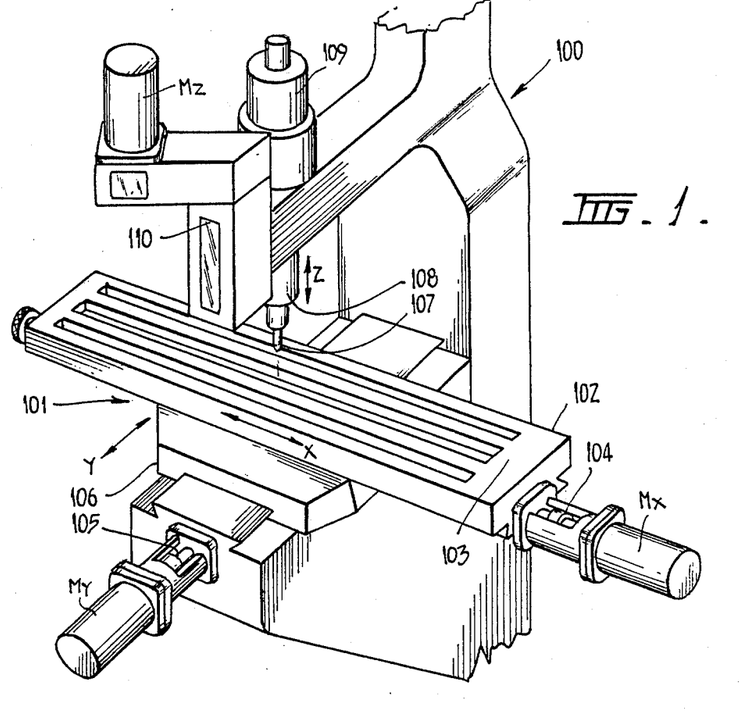
FIG. 1, is a perspective view of a conventional milling machine to which, in this embodiment, the invention is applied.

Turning to FIG. 1 of the drawings, there is illustrated a perspective view of a conventional milling machine, generally designated as 100, and to which this preferred embodiment of the invention is applied.

The milling machine basically comprises a machine table assembly 101 having an upper table 102, the upper surface of which provides a work support surface 103 on which a work piece is to be supported and which is caused to move transversely of the machine, along an axis designated by X, by means of a lead screw 104 which in turn is intermittently driven by a stepping motor $M_X$ in response to electrical drive pulses delivered to the motor from a micro-processor controlled motor drive circuit. The upper table is in turn supported on a lower support 106, which is caused to move in a direction perpendicular to the X axis, and along an axis designated by Y, by means of a lead screw 105 which in turn is intermittently driven by a stepping motor $M_Y$ in response to electrical drive pulses delivered to the motor from a motor drive circuit therefor which is under the control of a micro-processor.

The machine further incorporates a conventional milling cutter 107 suspended over the machine table in a conventional chuck arrangement 108 which in turn is rotatably driven by a cutter drive motor 109. The arrangement also incorporates an automatic drive 110 for raising and lowering the drive assembly for the milling cutter, in a direction or axis designated as Z, by means of a stepping motor $M_Z$ in response to electrical drive pulses delivered to the motor from a motor drive circuit therefor which may be under the control of the microprocessor, or may be manually actuated.

The machine shown in FIG. 1, and described above, is a conventional arrangement for a machine of this type and to which a conventional C N C system may be applied for the stepping motors to rotate the lead screws of the machine tool by fixed increments in response to drive pulses and under the control of a micro-processor.

However, in accordance with the present invention, and in relation to the tracing or machining of straight lines, a simple example of the use of the system of the present invention is as follows. Consider a straight configured contour the inclination or angle of which has components of 3, 5 and 11 in three directions designated X, Y and Z, respectively, and corresponding to the directions of advance of three incremental drives, in this case the stepping motors $M_X$, $M_Y$ and $M_Z$. Numbers given to counters associated with the motors may be 55, 33 and 15, which are in the ratios 1/3:1/5:1/11. Therefore, after 165 pulses have been fed to the counters, the motors will have taken 3, 5 and 11 steps in relation to the shorter, medium and longer components, respectively. If the input pulses to the counters are equally-spaced, then the steps taken by each motor will be equally-spaced. The counters can also be given a series of numbers corresponding to lines in different directions and instructed to change from one set of numbers to another at any stage.

In order to trace or machine an arc, the controller divides it into elemental intervals, usually 0.1 degree for large radii and 1.0 degree for small radii, and it generates a straight path mid-way between the straight chords and the straight tangents of the elemental arcs. However, in practice, the use of chords is sufficiently accurate for elemental intervals less than 2.0 degrees.

Figure 2:
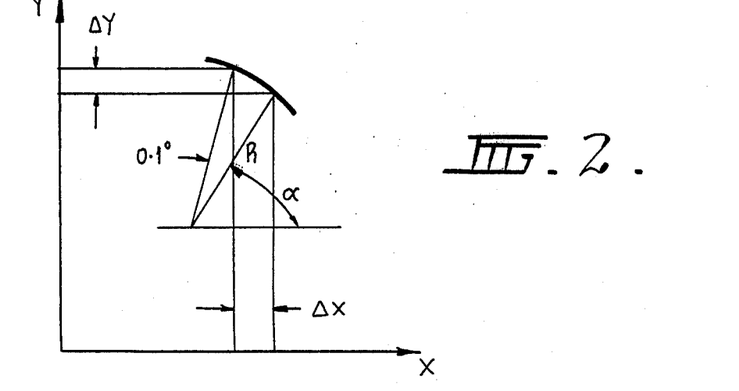
FIG. 2 is a representation of an arc in a single orthogonal plane for the purposes of explaining the basic concept of the present invention.

With reference to FIG. 2 of the accompanying drawings, consider an arc of unit radius in an orthogonal plane, e.g. the XY plane. The movements required for an elemental interval of 0.1 degree are:

$$\Delta X = \cos(\alpha + 0.1) - \cos \alpha$$

$$\Delta Y = \sin(\alpha + 0.1) - \sin \alpha$$

or $$\Delta X = -0.00175 \sin(\alpha + 0.05)$$

$$\Delta Y = 0.00175 \cos(\alpha + 0.05)$$

where $\alpha$ is the angle in degrees between the radius and the X axis at the start of the elemental interval. If P is the chosen number of pulses to be fed to the counters for each elemental interval and d is the step size, then Pd/$\Delta X$ and Pd/$\Delta Y$ are the numbers of input pulses to be counted by the X and Y axis counters, respectively, before they send pulses to their corresponding motors. The counters are provided with these numbers for all elemental intervals from $\alpha = 0$ to $\alpha = 89.9$ degrees and while traversing an arc of unit radius, each counter moves from one number to the next every time it receives P pulses. To change the arc radius from unity to any value R, all that is necessary is to arrange for the counters to move to their next numbers after PR input pulses instead of after P pulses. For any elemental interval, aR is the distance travelled and bPR is the time taken, where a is a constant and b is the input pulse period. Therefore the speed of travel is a/bP. It is independent of the arc radius and can be varied by changing the input pulse frequency. Arcs or straight lines and arcs can be joined smoothly by fixing the initial inclination of one to match the final inclination of its predecessor.

Figure 3:
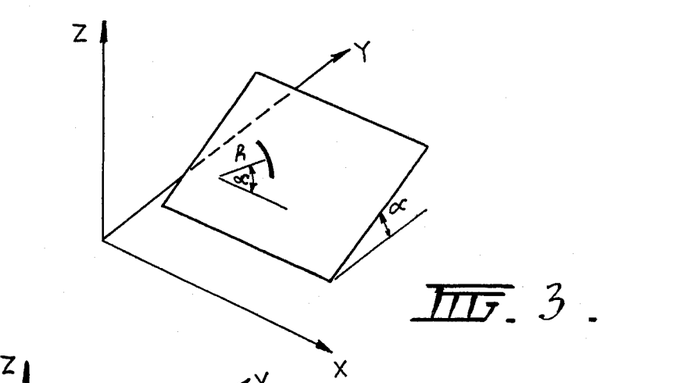
FIG. 3 is a representation of the same arc in a plane inclined to be orthogonal plane.

An arc can be generated in any plane. As a first example, and with reference to FIG. 3 of the drawings, take an arc of unit radius contained by a plane which makes an angle $\gamma$ with the XY plane and is perpendicular to the YZ plane. The radius of the arc makes an angle $\alpha$ degrees with the intersection of the inclined plane and the XY plane. For an elemental interval of 0.1 degree, the distances to be travelled in the X, Y and Z directions, respectively, are:

$$\Delta X = \cos(\alpha + 0.1) - \cos \alpha$$

$$\Delta Y = \cos \gamma \{\sin(\alpha + 0.1) - \sin \alpha\}$$

$$\Delta Z = \sin \gamma \{\sin(\alpha + 0.1) - \sin \alpha 56\}$$

or $$\Delta X = -0.00175 \sin(\alpha + 0.05)$$

$$\Delta Y = 0.00175 \cos \gamma \cos(\alpha + 0.05)$$

$$\Delta Z = 0.00175 \sin \gamma \cos(\alpha + 0.05)$$

For any elemental interval, the controller sends equally-spaced pulses to the X, Y and Z motors such that the distances $\Delta X$, $\Delta Y$ and $\Delta Z$ are moved simultaneously. The operation is similar to arc generation in an orthogonal plane except that an additional counter is used. It is provided with Pd/$\Delta Z$ values and it initiates pulses for the Z motor.

Figure 4:
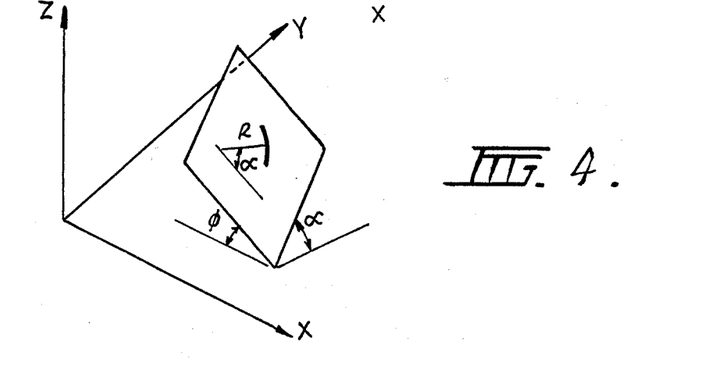
FIG. 4 is a representation of the same arc in a plane inclined to all of the orthogonal planes.

A more general case is an arc on a plane which is inclined to all orthogonal planes. Initially, and with reference to FIG. 4 of the drawings, consider an arc of unit radius on a plane which makes an angle $\gamma$ with the XY plane and whose intersection with the XY plane makes an angle $\phi$ with the X axis. In this case, the elemental distances travelled in the orthogonal directions are:

$$\Delta X = \cos \phi \{\cos(\alpha + 0.1) - \cos \alpha\} + \cos \gamma \sin \phi \{\sin(\alpha + 0.1) - \sin \alpha\}$$

$$\Delta Y = \sin \phi \{\cos \alpha - \cos(\alpha + 0.1)\} + \cos \gamma \cos \phi \{\sin(\alpha + 0.1) - \sin \alpha\}$$

$$\Delta Z = \sin \gamma \{\sin(\alpha + 0.1) - \sin \alpha\}$$

or $$\Delta X = 0.00175 \{-\cos \phi \sin(\alpha + 0.05) + \cos \gamma \sin \phi \cos(\alpha + 0.05)\}$$

$$\Delta Y = 0.00175 \{\sin \phi \sin(\alpha + 0.05) + \cos \gamma \cos \phi \cos(\alpha + 0.05)\}$$

$$\Delta Z = 0.00175 \sin \phi \cos(\alpha + 0.05)$$

The property of the system to smoothly join arcs together and to join arcs and straight lines using simple input instructions facilitates the synthesis of any curve from arcs and straight lines. Arcs to form a given curve within a chosen accuracy can be readily selected using a programmable calculator.

Alternatively, a curve can be synthesised to a chosen accuracy using short, straight lines. If $\Delta X$, $\Delta Y$ and $\Delta Z$, are the components of an elemental line in the orthogonal directions, d is the step size per motor pulse and P is the number of input pulses chosen to be fed to the counters for one line, then the counters are supplied with the numbers $Pd/\Delta X$, $Pd/\Delta Y$ and $Pd/\Delta Z$ for each line. The operation is then similar to the generation of an arc of unit radius. If the elemental lines are not of equal length, then for constant speed of travel, P must be made proportional to the length of the line for each element.

Figure 5:
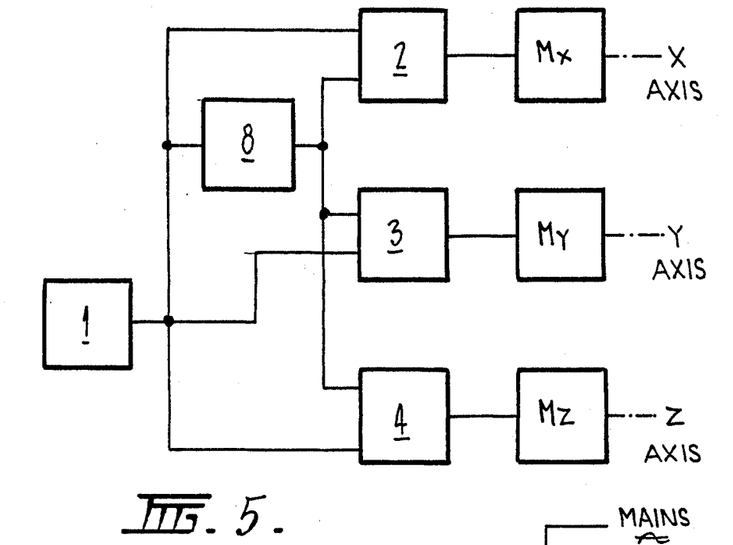
FIG. 5 is a schematic block diagram of the basic system in accordance with the present invention as adapted to form or cut a circular arc in a plane inclined to all of the orthogonal planes.

FIG. 5 is a schematic diagram in block form of a system in accordance with the present invention adapted to form or cut a circular arc in a plane inclined to all orthogonal planes, that is, requiring movements in three orthogonal directions. A pulse generator 1 feeds input pulses to three counters 2, 3 and 4, which in turn direct drive pulses to stepping motors $M_X$, $M_Y$ and $M_Z$ respectively for the X, Y and Z axes. The input pulses from the pulse generator are also fed to a main counter 8 which in turn feeds intermediate pulses to counters 2, 3 and 4 to alter the value of the number of input pulses each of those counters is to receive before feeding a drive pulse to the respective stepping motor.

The counters 2, 3 and 4 count pulses received from the pulse generator 1 and each time they receive $Pd/\Delta X$, $Pd/\Delta Y$ and $Pd/\Delta Z$ pulses, respectively, they send a drive pulse to the respective stepping motors $M_X$, $M_Y$ and $M_Z$. As for previous examples, P is the number of pulses chosen to be fed to the counters for an elemental interval, typically 0.1 degree, of a circular arc of unit radius, d is the step size and $\Delta X$, $\Delta Y$ and $\Delta Z$ are the orthogonal movements required for an elemental interval. Counter 8 simultaneously counts the pulses from the pulse generator 1 and each time it has received PR pulses, where R is a value related to the radius of the arc to be formed or cut, the counter 8 sends a pulse to counters 2, 3 and 4 causing those counters to adjust the number of $Pd/\Delta X$, $Pd/\Delta Y$ and $Pd/\Delta Z$ input pulses they are to receive before delivering a drive pulse to their respective stepping motors.

Figure 6:
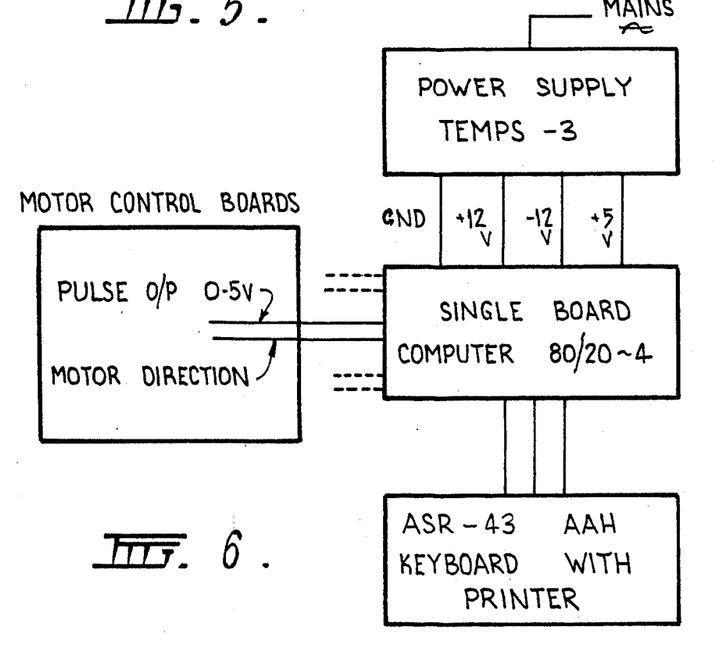
FIG. 6, is a block diagram of the basic requirements of the control system for this preferred form of the invention.

Turning to FIG. 6 of the drawings, in accordance with this preferred embodiment of the invention, the basic principles of the invention are put into effect utilising the hardware set down in FIG. 6, and comprising a power supply for the computer or microprocessor identified as a Temps-3 as supplied by Adtech Power, Inc., which feeds a single board computer (S B C) 80/20-4 incorporating firmware identified as an Intel 2716 Eprom as supplied by Intel Corporation, and which in turn is coupled to a keyboard with printer identified as an ASR-43AAH as supplied by Teletype Corp. The coupling between the S B C and the keyboard is achieved by an RS-232C D-type connector in which the pins 4, 6 and 14 of the J3 connector of the S B C is coupled to pins 2, 3 and 7 of the RS-232C connector and thus to the keyboard. Pins 8 and 10 of the J3 connector are coupled together. The S B C is in turn coupled to motor control boards for each of the stepping motors to achieve motor control as to be later described. Via the keyboard the operator supplies details of the shape of the contour to be formed and the speed at which it is to be formed in accordance with programs also to be later described. The keyboard unit further incorporates a printing device which records the input details as they are forwarded to the computer.

The computer as identified and programmed receives the input details and converts them to two (in the case of two dimensional contours) or three (in the case of three dimensional contours) sets of control pulses appropriate for the two, or three, orthogonal movements in the machine tool to be controlled. The computer in turn provides control pulses to motor control boards corresponding to each stepping motor $M_X$, $M_Y$ and $M_Z$. Linear drive chips 7400(J) as supplied by National should also be inserted into the socket members A5, A6, A11 and A12 on the S B C to provide protective buffers for the equipment.

Figure 7:
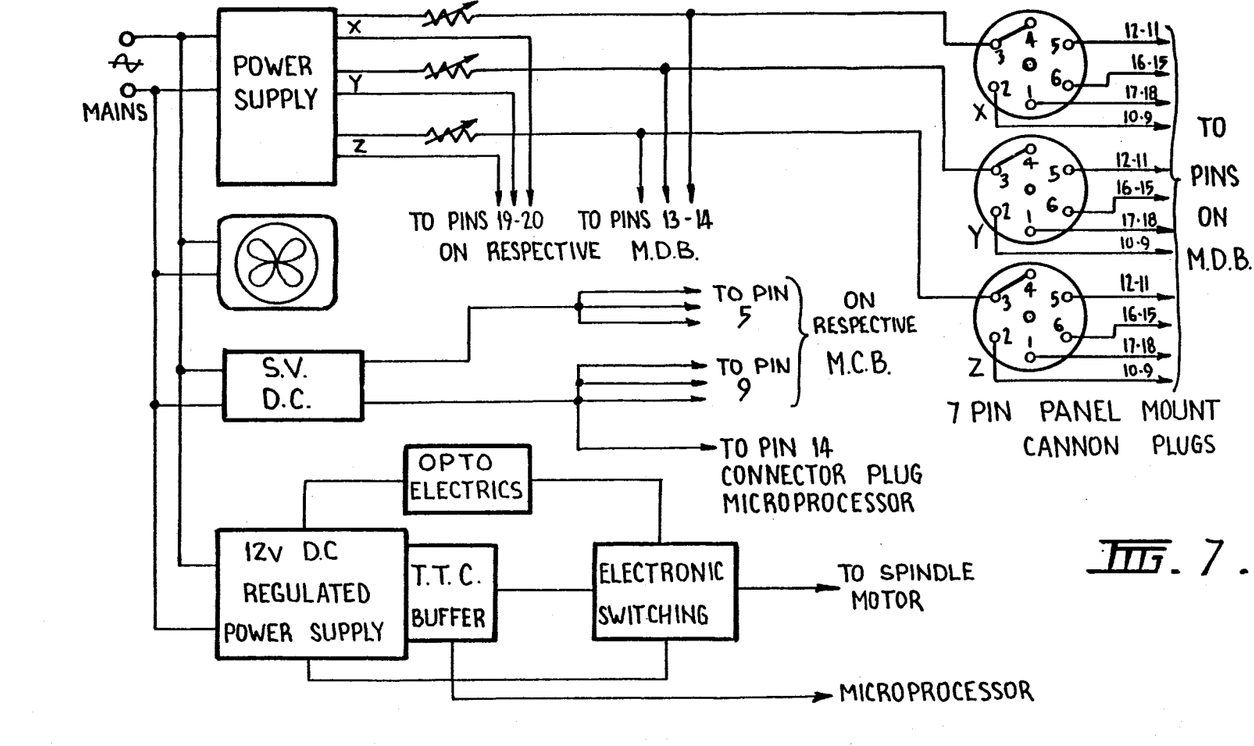
FIG. 7, is a detailed circuit diagram of the power supply circuit for the stepping motors.
Figure 10:
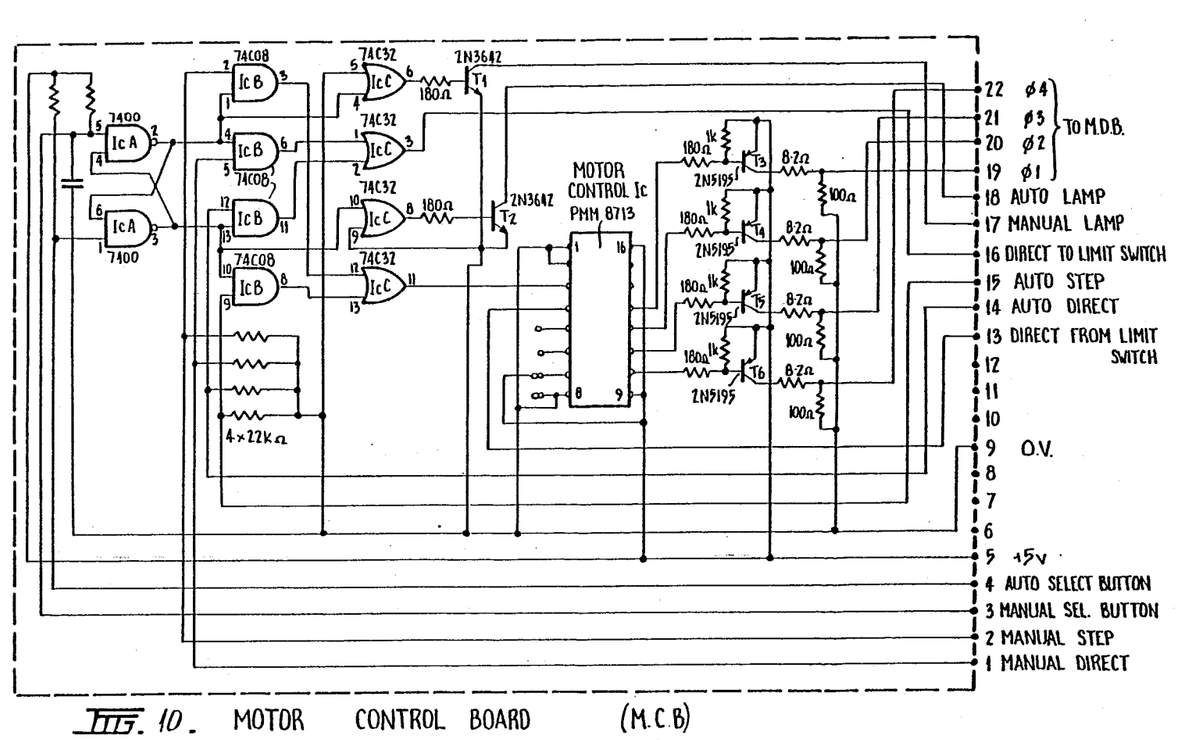
FIG. 10, is a detailed circuit diagram for the respective motor control boards.
Figure 11:
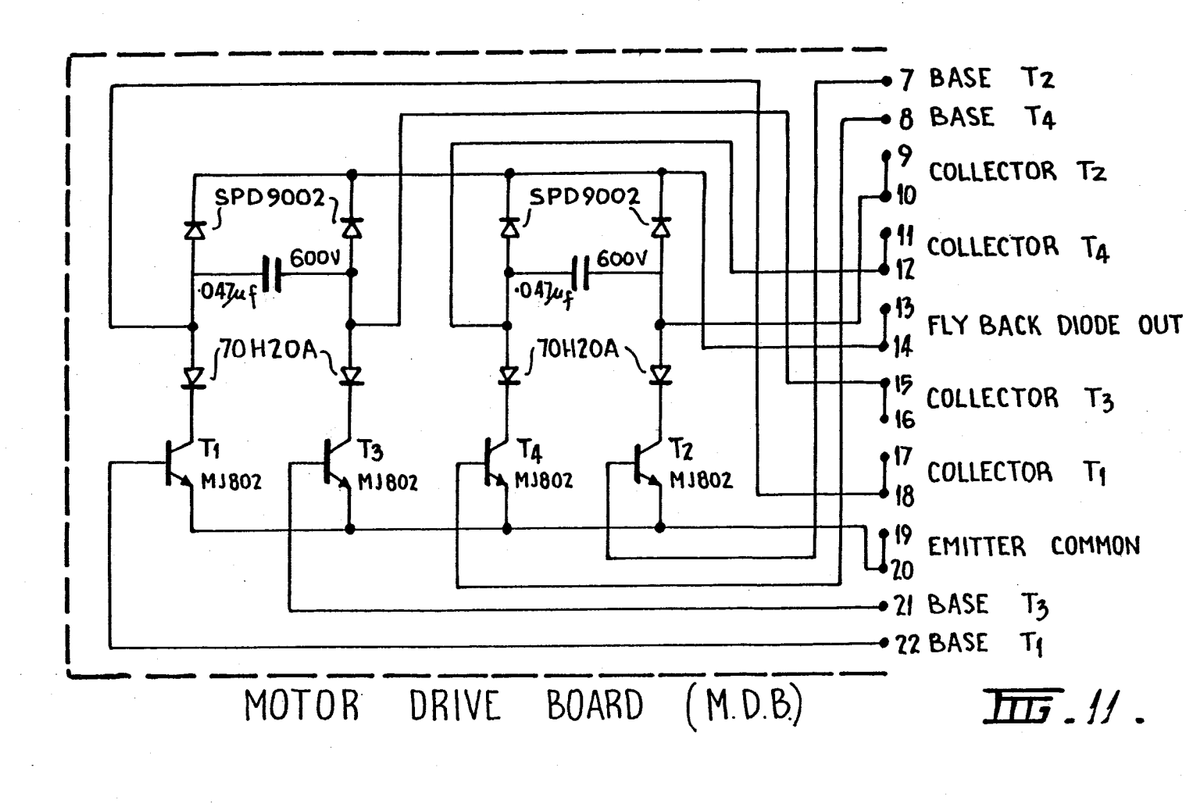
FIG. 11, is a detailed circuit diagram for the respective motor drive boards.

Turning to FIG. 7 of the drawings, the basic circuit requirements are shown for the main power supply which provides power to the respective motor drive boards (MDB'S) for each stepping motor, the details of which are shown in FIG. 11, via the pin connectors as indicated, and also the stepping motors via the 7-pin cannon connectors at the pin connections as indicated. The mains power also supplies a cooling fan for the unit as illustrated, and a rectified 5VD.C. supply to motor control boards (MCB'S), the details of which are shown in FIG. 10 of the drawings. The mains power supply is also coupled, via a suitable 12VD.C. regulated power supply, opto electrics, T.T.L. buffer and electronic switching, to the motor 109 for the drive spindle of the milling cutter, and also the computer via the plugs of a cannon connector type DA-15P shown, and the connections through which are also to be later described. The pins as nominated for the cannon connector in FIG. 7 are also connected to the pins as nominated for the MDB'S for the respective stepping motors $M_X$, $M_Y$ and $M_Z$.

Figure 9:
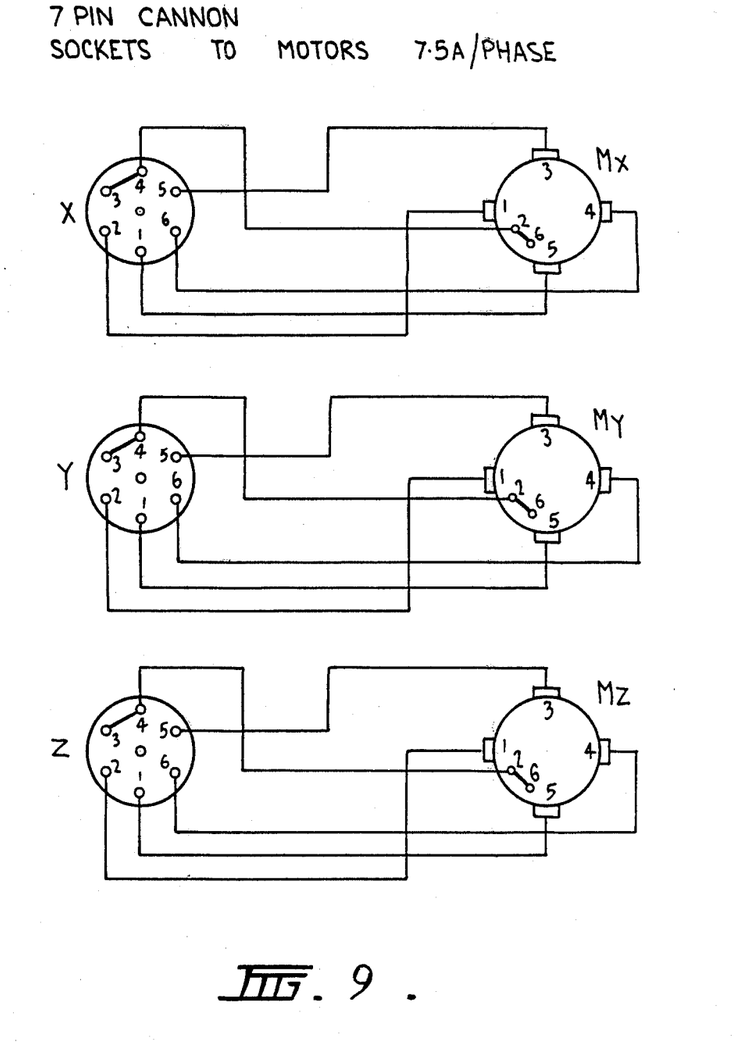
FIG. 9, is a detailed circuit diagram of the connections for the stepping motor circuits.

The pin connections within the sockets of the cannon connectors to the respective connections within the stepping motors are shown in FIG. 9.

Figure 8:
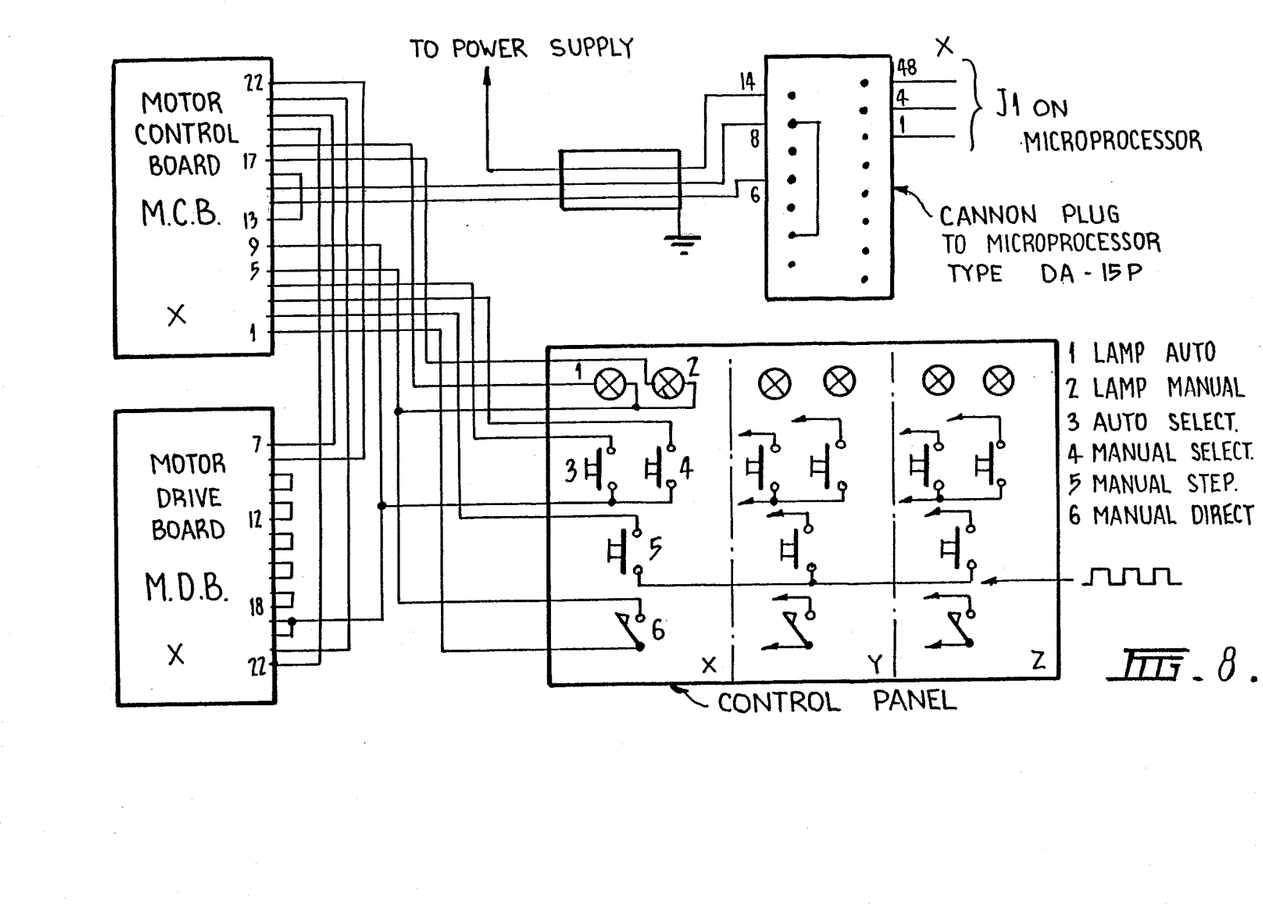
FIG. 8, is a detailed circuit diagram for the operator controls.

FIG. 8 of the drawings shows the details of the main control panel and the connections therein for actuating automatic and manual selection and select functions for the stepping motors as well as lamps indicating selection of manual or automatic function for each of the stepping motors, and in respect of which only the connections to the MCB and the MDB for the X-axis motor $M_X$ are shown for the sake of simplicity of illustration. Both the MCB and MDB pin connections from the mains power supply, and also for the control panel and the computer via the cannon plug type DA-15P will be evident from FIG. 8, with reference to FIG. 7. It will be appreciated that similar connections will be facilitated for the MCB'S and MDB'S for the Y and Z axis motors $M_Y$ and $M_Z$. In the example shown for the X-axis control and drive, pins 8, 6 and 14 of the cannon plug connector are coupled to pins 48, 4 and 1 respectively of the connector identified as J1 on the computer. The respective pin connections for the connection between the MCB and the MDB are also shown in FIG. 8.

FIGS. 10 and 11 of the drawings show the details of the individual MCB'S and MDB'S which are coupled, at the pin connections indicated, to each other, and to the control panel switches and lamps, and the computer, as shown in FIG. 8. Each MCB incorporates a stepping motor driving controller identified as PMM8713 as supplied by Sanyo Denki Co. Ltd. of Japan.

The MCB'S receive control pulses from the computer, or alternatively receive manually actuated pulses from the control panel, and subsequently convert the control pulses into motor mode control pulses which are then supplied to the respective MDB'S. The MDB'S which receive the motor mode control pulses from the MCB'S amplify them to motor drive pulses which are subsequently supplied to the respective stepping motors $M_X$, $M_Y$ and $M_Z$ via the 7-pin cannon connections shown in FIGS. 7 and 9.

As it will be evident from a consideration of FIG. 8, the manual controls on the control panel enable the operator to select whether the control pulses for the motors $M_X$, $M_Y$ and $M_Z$ will be supplied from the computer or from the manual control board itself. When the latter is selected, the operator is able to control the number of pulses to each motor and to choose the direction or sign of the resulting movement of the particular machine axis to which the respective motors are coupled.

Figure 12:
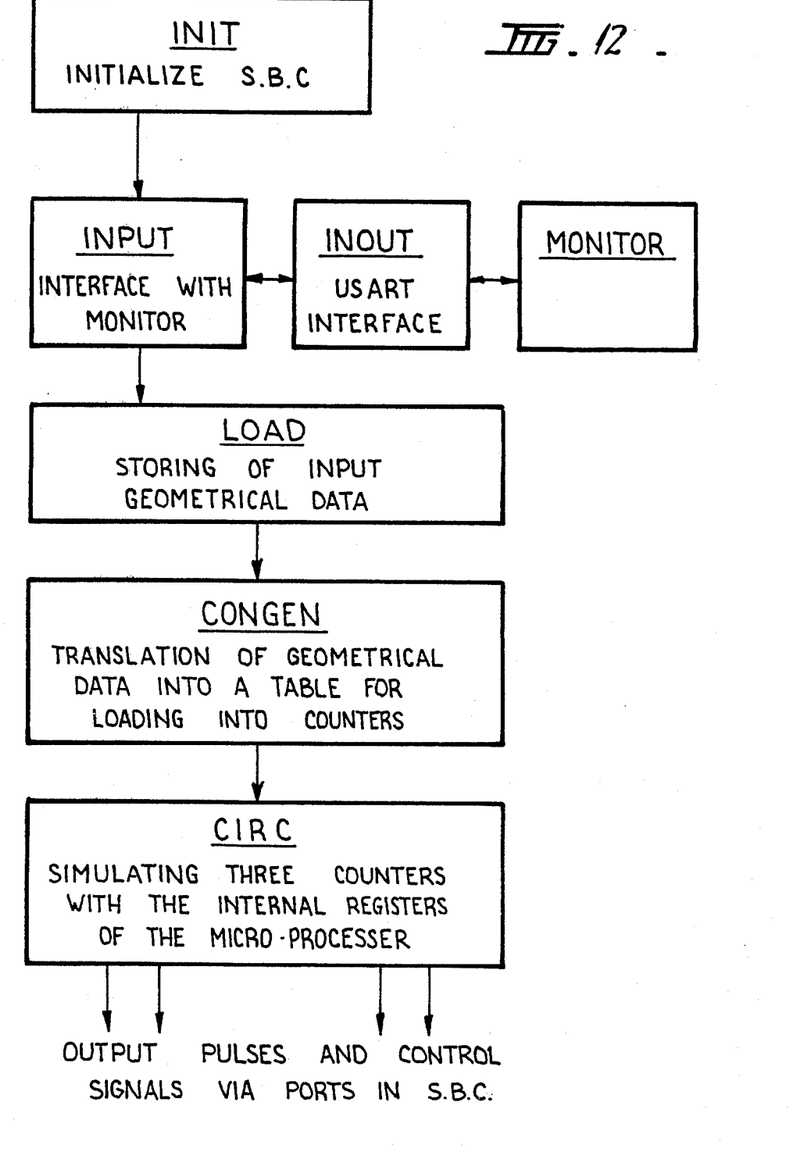
FIG. 12 is a flow chart of the basic programming requirements for the micro-processor

FIG. 12 of the drawings represent a flow chart of the programmed information to be supplied to the computer, which in the case of this embodiment invovles programming for movement in the X and Y axes via motors $M_X$ and $M_Y$, with movement in the Z axis via motor $M_Z$, if required, being accomplished by manual control of the appropriate functions of the control panel and as previously discussed.

Figure 13:
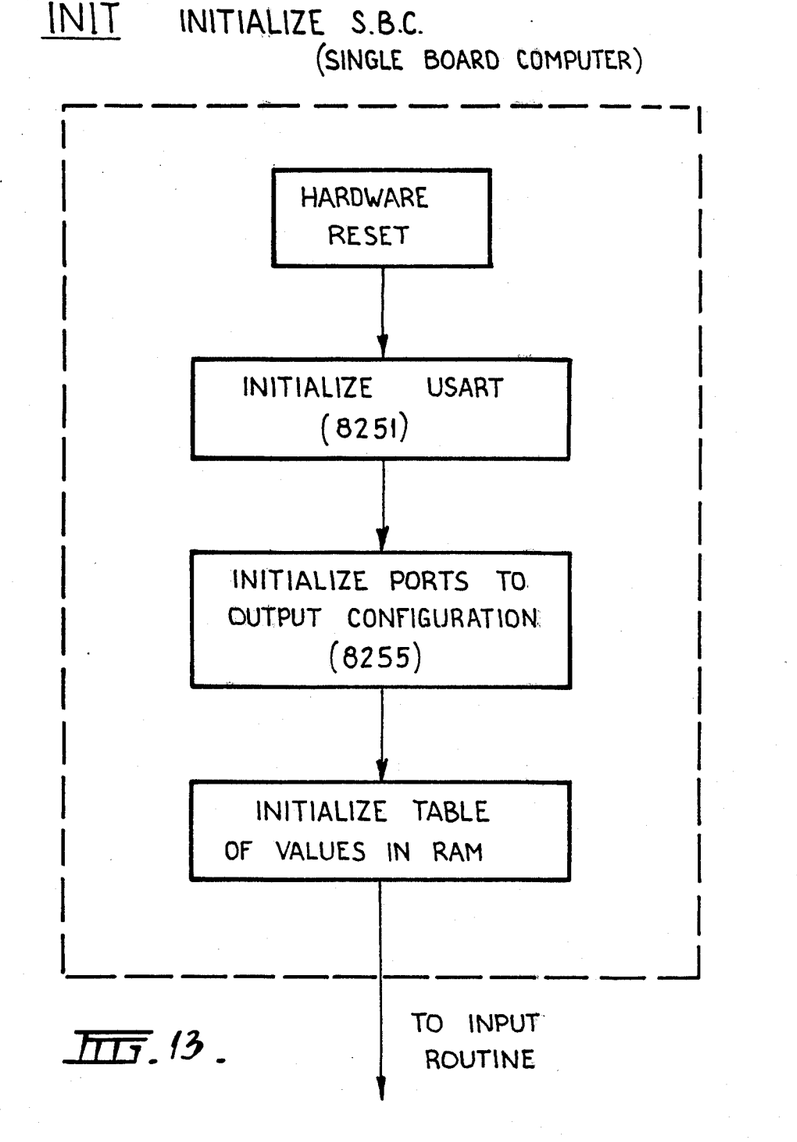
FIG. 13 is a flow chart of the requirements of initial programming step.

It will be observed that the programming involves preparation of an initial data for initiating the computer according to the parameters laid down in FIG. 13. This first section of the program can be readily prepared by a programmer, although a specific example of such a program is set down in Annexure "A" hereto.

Figure 14:
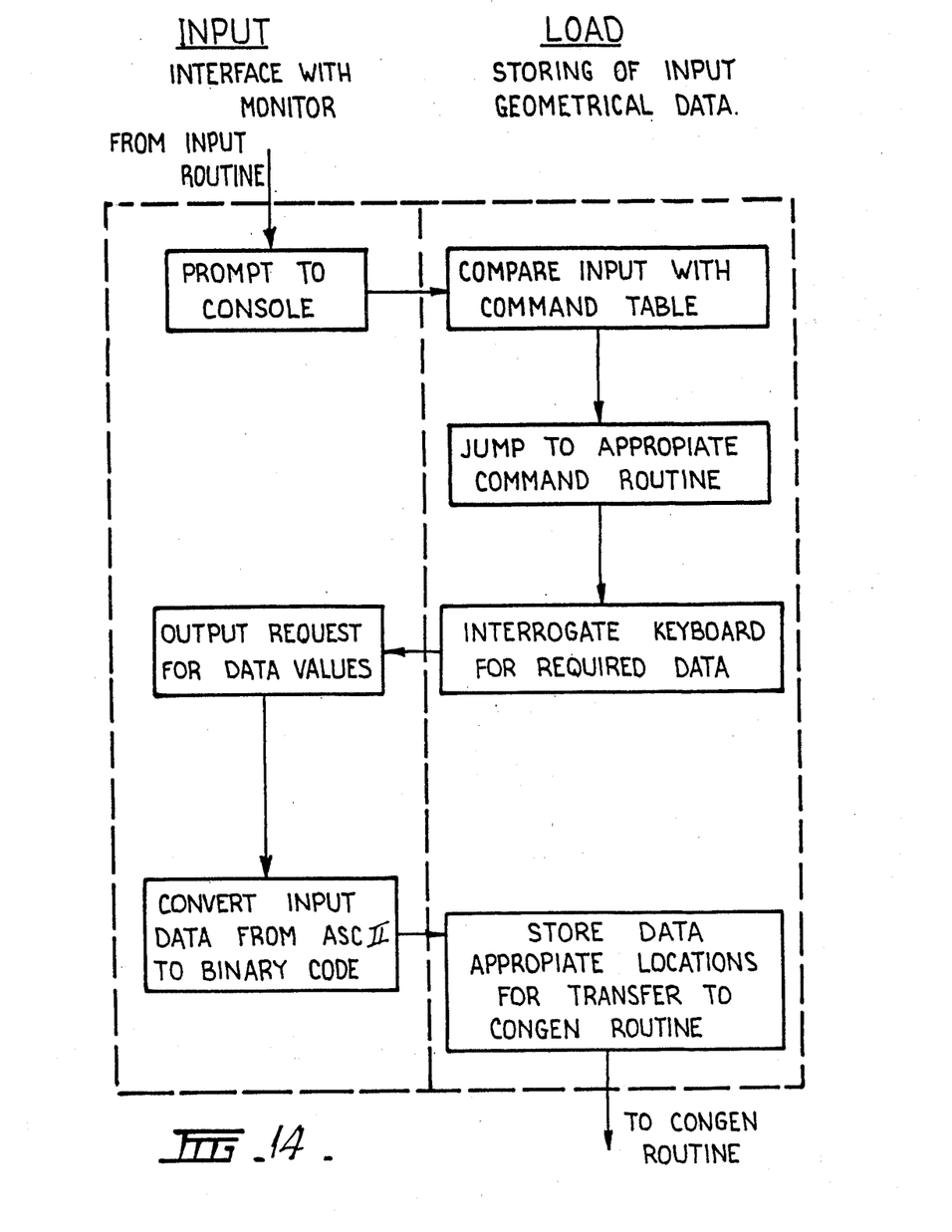
FIG. 14 is a flow chart of the requirements of the input and load programming steps.

The initial programming step is followed by INPUT (interfacing with the monitor for the input routine) and LOAD (storing of the input geometrical data) programming according to the information set down in FIG. 14. This section of the program can also be readily prepared by a programmer, although once again specific examples of such programs are set down respectively in Annexures "B" and "C" hereto.

Figure 15:
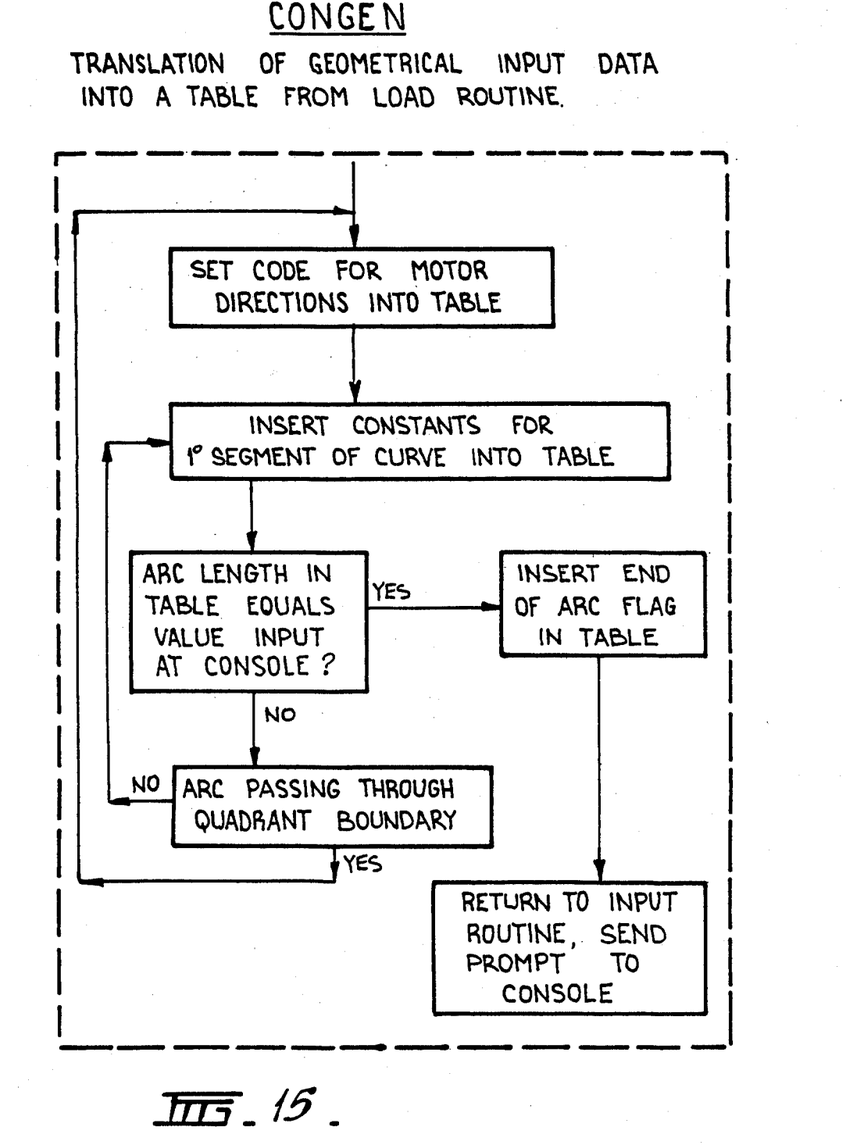
FIG. 15 is a flow chart of the programming requirements for the translation of geometrical parameters into a table as required by the load routine.

The following programming step involves what is referred to as CONGEN (translation of geometrical input parameters into a table from the input routine), and according to the information set down in FIG. 15. This section of the program can also be readily prepared by a programmer, although a specific example of such a program is set down in Annexure "D" hereto.

Figure 16:
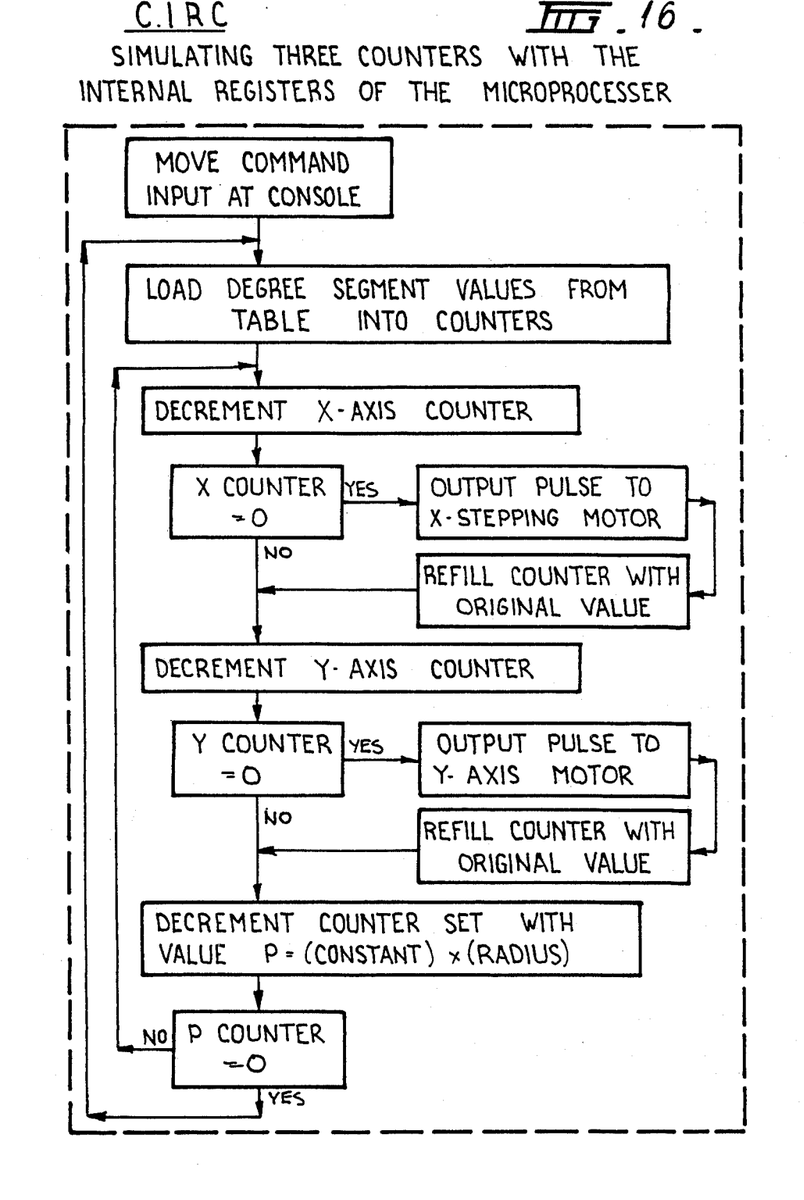
FIG. 16 is a flow chart of the programming requirements for simulating three counters with the internal registers of the micro-processor.

The programming steps are completed by what is referred to as CIRC (simulating three counters with the internal registers of the micro-processor), and according to the information set down in FIG. 16. This final section of the programming can be readily prepared by a programmer, although once again a specific example is set down in Annexure "E".

As discussed previously the system of the present invention can be used on a wide variety of numerically-controlled machine tools and other machines and apparatus. Surfaces can also be readily generated by the translation or rotation of lines.

The system can also be applied to rotational motion such as the rotation of a work piece or of a machine head about one or more axes.

We claim:

1. A method of controlling an apparatus for forming a straight configured contour, or a straight configured segment forming part of a curvilinear contour, and having coordinates in at least two directions, said apparatus incorporating a work piece support, a contour forming means, incremental drives to effect relative movement between said support and said contour forming means in said directions, said method comprising the steps of:

(a) determining the components of said contour or segment in said directions as a number of increments of length equal to a predetermined distance,
(b) for each said direction, producing a count to a predetermined number, the predetermined numbers for said directions being related to each other as the ratio of the inverses of said number of increments for each said direction, and
(c) feeding,
   (i) a drive pulse to one of said incremental drives to effect movement in one of said directions over said predetermined distance each time the predetermined number relevant to that direction has been counter, and
   (ii) a drive pulse to at least one other of said incremental drives to effect movement in one other of said directions over the same predetermined distance each time the predetermined number relevant to that direction has been counted,
whereby said movements combine to form a relative movement between said support and said contour forming means such as to produce said contour or said segment.

2. A control system adapted for association with an apparatus for forming a straight configured contour, or a straight configured segment forming part of a curvilinear contour, and having coordinates in at least two directions, said apparatus being of the type comprising a work piece support, a contour forming means, incremental drives to effect relative movement between said support and said contour forming means in said directions, said control system being adapted to deliver drive pulses to said incremental drives, and comprising means to count, for each said direction at the same rate, to a predetermined number the numbers being related to each other as the ratio of the inverses of the number of increments of predetermined distance in each said direction, means for, in use, feeding
(i) a drive pulse to one of said incremental drives to effect movement in one of said directions over said predetermined distance each time the predetermined number of input pulses relevant to that direction has been counted, and
(ii) a drive pulse to at least one other of said incremental drives to effect movement in one other of said directions over the same predetermined distance each time the predetermined number relevant to that direction has been counted,
whereby said movements combine to form a relative movement between said support and said contour forming means such as to produce said contour or said segment.

3. A control system as claimed in claim 2, wherein the means to count to said predetermined number is a computer, and the means for feeding drive pulses to the respective incremental drives are motor control boards which receive control pulses from the computer and convert them into motor mode control pulses which are subsequently received by motor drive boards which amplify them to motor drive pulses and deliver such to the respective incremental drives.

4. An apparatus in combination with a control system as claimed in claim 2 or 3.

5. A machine tool in combination with a control system as claimed in claim 2 or 3.

6. A method of controlling an apparatus for forming straight contour portions in which said contour portions have coordinates in at least two directions and said apparatus includes a work piece support, a tool support, incremental drive to effect relative movement between said work piece support and said tool support, said method comprising the steps of:
(a) determining the components of said contour portions in said directions as a number of increments of predetermined length in each direction;
(b) calculating predetermined count values associated, respectively, with said directions, said count values being related to each other as the ratio of the inverses of the number of increments of predetermined length in each said direction;
(c) forming a running count;
(d) feeding a drive pulse to one of said incremental drives to effect movement in one of said directions over said predetermined length each time said running count reaches one of said predetermined count values; and
(e) feeding a drive pulse to another of said incremental drives to effect movement in another one of said directions over said predetermined length reaches another of said predetermined count values;
whereby movements of said incremental drives combine to form a relative movement between said work piece support and said tool support.

* * * * *